United States Patent

Buschmann

[11] Patent Number: 4,746,174
[45] Date of Patent: May 24, 1988

[54] METHOD AND BRAKE SYSTEM FOR TRACTION SLIP CONTROL

[75] Inventor: Gunther Buschmann, Griesheim, Fed. Rep. of Germany

[73] Assignee: Alfred Teves GmbH, Frankfurt am Main, Fed. Rep. of Germany

[21] Appl. No.: 931,553

[22] Filed: Nov. 14, 1986

[30] Foreign Application Priority Data

Nov. 14, 1985 [DE] Fed. Rep. of Germany ....... 3540366

[51] Int. Cl.⁴ .......................... B60K 28/16; B60T 8/32
[52] U.S. Cl. ..................................... 303/110; 180/197; 188/347; 188/348; 303/114; 303/119
[58] Field of Search .......................... 303/111, 113–119, 303/61–63, 68–69, 91, 93, 110, 100, 6 R; 188/181, 347, 348, 358–359; 180/197, 244

[56] References Cited

U.S. PATENT DOCUMENTS

| | | | |
|---|---|---|---|
| 4,492,413 | 1/1985 | Belart et al. | 303/114 X |
| 4,565,411 | 1/1986 | Seiber | 303/110 |
| 4,578,951 | 4/1986 | Belart et al. | 303/114 X |
| 4,626,043 | 12/1986 | Belart et al. | 303/114 |
| 4,641,895 | 2/1987 | Belart et al. | 303/119 |
| 4,643,486 | 2/1987 | Belart et al. | 303/114 |
| 4,676,558 | 6/1987 | Klein | 303/114 |

FOREIGN PATENT DOCUMENTS 2083581 3/1982 United Kingdom ............... 303/114

*Primary Examiner*—Douglas C. Butler
*Attorney, Agent, or Firm*—James B. Raden; Robert P. Seitter

[57] ABSTRACT

For traction slip control, the wheel brakes (13, 14) of the driven wheels (VR, VL) are connected to the auxiliary-pressure source (5, 6) of the brake system by electromagnetically actuatable multidirectional control valves (E11, E12). In an initial phase at the beginning of brake actuation, the wheel brakes (13, 14) are connected for a short time to the pressure-compensating reservoir (7) of the brake system by way of biassed non-return valves (29, 30) and an outlet valve (A28) so that, prior to the actual commencement of traction slip control, lost travels are covered, the wheel brakes (13, 14) are applied and defined and even pressure level is thereby produced in the wheel brakes.

7 Claims, 1 Drawing Sheet

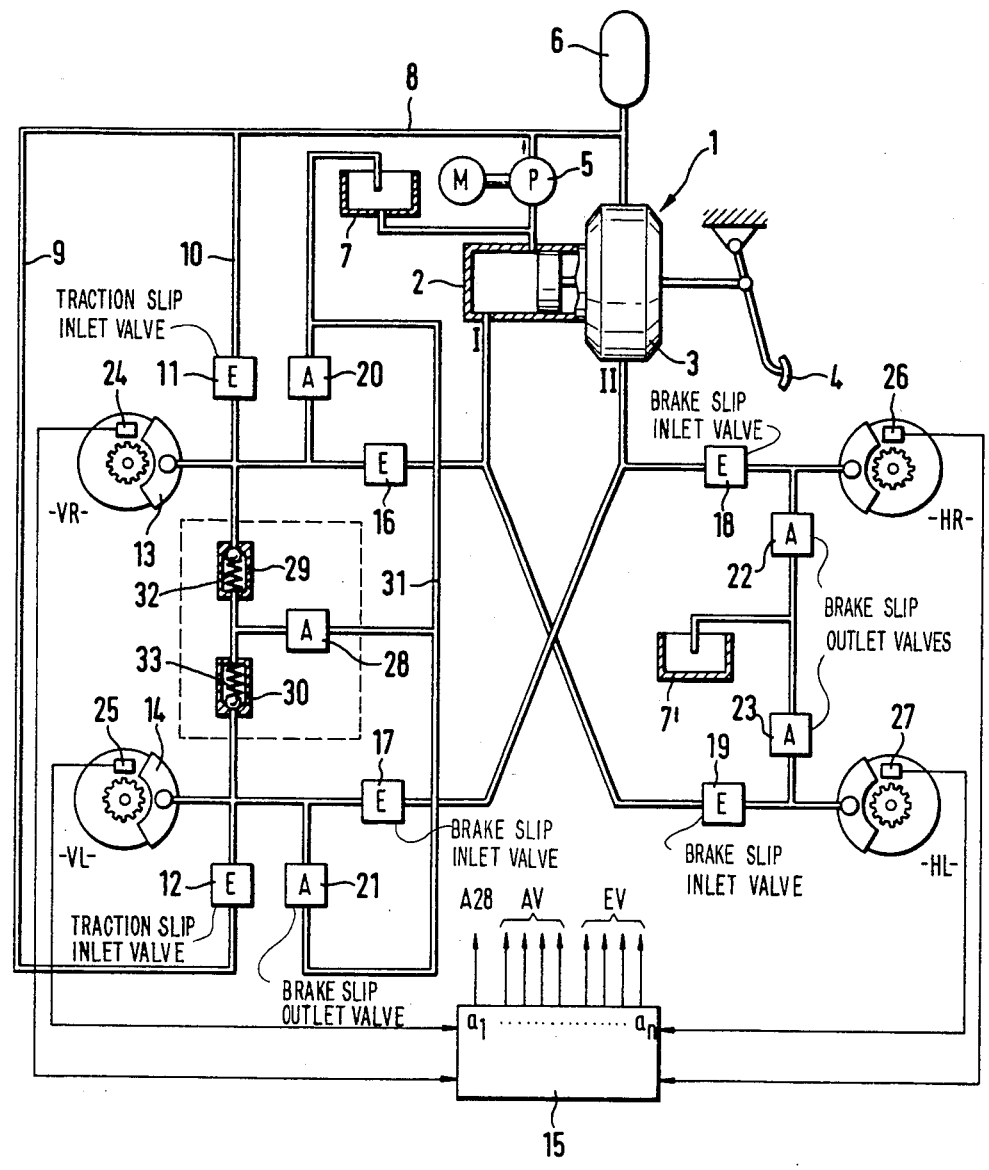

METHOD AND BRAKE SYSTEM FOR TRACTION SLIP CONTROL

BACKGROUND OF THE INVENTION

The present invention relates to a method for traction slip control in automotive vehicles with the aid of wheel brakes which are actuated by pressure fluid. The wheel brakes are connected for the development of braking pressure to an auxiliary-pressure source for specific intervals derived from the rotational behavior of the wheels.

The use of the brake system of the automotive vehicle for the control of traction slip is known. To this end, an anti-lock control system including an auxiliary-pressure source and sensors for measurement of the wheel rotational behavior is provided such that, even in the event of the brake not applied, namely in the presence of excessive driving force or for control of traction slip, braking pressure can be built up in the driven wheels by way of additional pressure fluid conduits. (German laid-open applications Nos. 33 38 826; 34 07 538; and, 34 07 539). With the aid of electromagnetically actuated multidirectional control valves, a connection is established between the pressure source and the wheel brake of the skidding wheel, a braking pressure generator or directly. The magnitude of the necessary braking energy is determined from the wheel rotational behavior by means of calculating circuits in the electronic control unit and is predefined by the duration of the intervals of excitation, that is the open-passage periods, of the valve which constitutes the connection between the pressure source and the wheel brake. The quality of the control is dependent on the precision of pressure proportioning. The pulses or pulse trains determining the open-passage periods of the valve therefore must be set precisely. This is particularly so because these valves are wheel brakes which are connected to the auxiliary-pressure source and thus to a very high pressure level. In doing so, difficulties arise with the known methods and brake systems. This is because, at the beginning of brake actuation, first the so-called clearance and other lost travels must be overcome. That is, the brakes must be applied prior to a braking effect being able to occur. However, the volume of pressure-transmitting medium required to cover these lost travels differs as a consequence of manufacturing tolerances, adjustment of the brakes uneven wear, etc. Accordingly, a filling period or duration of change-over of the braking-pressure inlet valves which is invariably preset in time does not permit an even pressure level in the individual wheel brakes.

To overcome these lost travels, in actual practice a filling pulse invariable in time is arranged which allows changing the braking-pressure inlet valves over to their opened position for a specific constant time. An even pressure level in the wheel brakes cannot be accomplished thereby. Varying pressure is instead built up by the constant filling pulse, depending on the lost travel covered. Proportioning of the pressure during the subsequent traction slip control operation suffers from this initial inaccuracy.

Therefore, it is an object of the present invention to overcome the difficulties described and, within traction slip control, to eliminate the effects the different lost travels which must be covered until application of the brake have on the proportioning of the braking pressure and thus on the control accuracy. This is attained by simple means and without entailing any appreciable additional effort.

SUMMARY OF THE INVENTION

This object is achieved in a method which overcomes the difficulties described in that in an initial phase at the beginning of brake actuation, an amount of pressure is metered for a short time into the wheel brakes of at least the driven wheels which is just sufficient to overcome lost travels, clearances and the like, that applies to the brake. According to a particularly expedient embodiment of the present invention, in the initial phase, the pressure in the wheel brakes is confined to a predetermined value. To this effect, a biassed valve which is set to the pressure required to apply the brakes of (for example, 3 to 10 bar) can be connected with a pressure-compensating reservoir.

A brake system for implementing the inventive method comprises a braking pressure generator, an auxiliary-pressure source, a pressure-compensating reservoir and multidirectional control valves for the introduction of pressure out of the auxiliary-pressure source into the wheel brakes. The system further comprises wheel sensors as well as an electronic control circuitry for the generation of braking-pressure control signals. A feature of the brake system in accordance with the present invention resides in the provision of pressure-fluid lines arranged for communication between the wheel brakes of the driven wheels and the pressure-compensating reservoir. Electromagnetically actuatable multidirectional control valves, closed in their de-energized state, as well as valve assemblies set to the pressure in the initial phase are inserted into the lines.

According to a further embodiment, biassed non-return valves as valve assemblies are used. To economize the total number of multidirectional control valves, it is possible to assign to each driven wheel one separate non-return valve which is connected to the pressure-compensating reservoir by way of one common, normally closed two-way/two-position directional control valve.

According to the instant invention a simple measure which can be readily implemented enables a considerably precise adjustment of the braking pressure and control of the traction slip because tolerances and wear phenomena influencing the lost travel are compensated for in the initial phase. In contrast to previous methods and brake systems, the zero position, that is the reference pressure at the commencement of the controlled braking pressure development, is determined. Delayed response of the control due to a relatively long lost travel, undesirable pressure differences in the wheel brakes of the driven wheels, etc., is reliably precluded.

BRIEF DESCRIPTION OF THE DRAWING

Further features, advantages and possibilities of application of the present invention can be gathered form the following description of an embodiment with reference to the accompanying drawing which depicts a schematically simplified view of the most important assemblies of the inventive brake system and the hydraulic connection of the components in an automotive vehicle with front-wheel drive.

DETAILED DESCRIPTION

The brake system illustrated comprises a dual-circuit hydraulic brake power booster 1 which is composed of a master cylinder 2 and a power brake booster 3. A brake pedal 4 is likewise illustrated symbolically. In this embodiment, an auxiliary-pressure source is composed of an electromotively driven hydraulic pump 5 and a hydraulic pressure accumulator 6. The suction side of the pump 5 communicates with a pressure-compensating reservoir 7 which also serves as a pressure-compensating and supply reservoir of the braking pressure generator 1.

An anti-lock brake system is provided which is extended to a traction slip control system by virtue of an additional hydraulic connection by way of the lines 9, 10 into which inlet valves E11, E12 are inserted. The valves provide communication between the brakes 13, 14 of the driven front wheels VR, VL and the auxiliary-pressure source 5, 6, and are under control of the electronic control circuitry within a control unit 15.

For brake slip control, inlet valves and outlet valves E16 to 19, A20 to 23 are inserted into the two hydraulic circuits I, II which lead to diagonal wheels VR, HL and VL, HR, respectively. In order to prevent locking of the wheels and to keep the brake slip in the optimal range, these valves E, A16 to 23 serve to maintain the braking pressure constant, to decrease it and to re-increase it at the appropriate time individually for each wheel. For instance, two-way/two-position directional control valves which are open in their de-energized state can be used as inlet valves E16 to 19 which can be switched over to close by an electromagnetic signal during the control period. In contrast thereto, the outlet valves A20 to 23 are closed normally, that means in the de-energized state, and permit to be switched over to their opened condition by electric signals, whereupon pressure fluid discharges into the pressure-compensating reservoir 7, 7' for the purpose of pressure reduction.

The braking-pressure control signals serving to switch the inlet and outlet valves E, A16 to 23 over are generated by means of the electronic control unit 15. The control unit 15 is supplied with information about the wheel rotational behavior by way of wheel sensors 24 to 27. Afater logic combining, signals will be avialable at the outlets $a_1$ to $a_n$ which are delivered by way of signal lines (not shown) to the inlet valves EV (E16 to 19) and outlet valves AV (A20 to 23) and to an additional outlet valve A28.

To implement the method of the present invention by which improvement of traction slip control is attained, the wheel brakes 13, 14 of the two driven wheels VR, VL are each connected to a return line 31 leading to the pressure-compensating reservoir 7 by way of a biassed non-return valve 29 and 30, respectively, and by way of the additional outlet valve 28. The bias of the non-return valves 29, 30 is in each case accomplished by a spring 32, 33 which permits the non-return valves to open only after an amount of pressure has developed which is just sufficient to apply the brakes 13, 14.

At the beginning of a traction slip control operation, first the additional outlet valve A28 is excited in an initial phase for a very short period of time which will not result in any appreciable delay of the brake actuation. This causes the valve 28 to switch to open so that the pressure introduced by way of the inlet valves E11, E12 out of the auxiliary pressure source 5, 6 is able to overcome the lost travels in the brakes 13, 14 and to apply the brakes, while, however, the braking pressure is limited to the opening pressure set by the springs 32, 33 of the biassed non-return valves 29, 30. Thus, a defined and even pressure level will be attained in the wheel brakes 13, 14 of the driven wheels VR, VL. After this initial phase, the outlet valve 28 will re-assume its initial position in which it is closed so that the predetermination of the change-over times for the inlet valves E11, E12 allows precise setting of braking pressure in the wheel brakes 13, 14 which is required for optimal traction slip control, and which is ascertained by the control unit 15 and is transferred into corresponding actuation signals for the valves E11, E12. The variations or differences in pressure to be expected are very slight because a reference point for the pressure development had been created owing to the described initial phase or filling phase of the wheel brake cylinders.

What is claimed is:

1. A method for traction slip control in automotive vehicles with the aid of wheel brakes which are actuated by pressure fluid and which are connected for the development of braking pressure to an auxiliary-pressure source for specific intervals derived from the rotational behavior of the wheels, said method comprising the steps of: determining an initial phase time period related to the time period of the lost travels and clearances of said wheel brakes; and, metering an amount of traction slip brake pressure into the wheel brakes (13, 14) of the driven wheels (VR, VL) at the beginning of traction slip brake actuation and during said initial phase, which amount is just sufficient to overcome lost travels and clearances.

2. A method for traction slip control as claimed in claim 1, further comprising the step of limiting the pressure in the wheel brakes (13, 14) to a predetermined value.

3. A method for traction slip control as claimed in claim 2, further comprising the step of connecting the wheel brakes (13, 14) to a pressure-compensating reservoir (7) by way of spring biassed valve assemblies (29, 30) which are set to the pressure necessary for applying the brakes (13, 14).

4. A method for traction slip control as claimed in claim 3, further comprising the step of limiting, in the initial phase, the pressure to 3 to 10 bar.

5. A brake system for traction slip control in automotive vehicles having driven wheels and wheel brakes comprising a braking pressure generator, and auxiliary-pressure source, a pressure-compensating reservoir and pressure valves for the metering of pressure out of the auxiliary-pressure source into the wheel brakes of the driven wheels, further comprising wheel sensors and an electronic control circuit for the generation of braking-pressure controls signals, wherein traction slip control pressure fluid lines (31) are arranged to provide communication between the wheel brakes (13, 14) of the driven wheels (VR, VL) and the pressure-compensating reservoir (7), at least one electromagnetically actuatable multidirectional control valve (28) inserted in said fluid lines between said wheel brakes of the driven wheels and said reservoir, said control valve being closed in its de-energized state and being responsive to said control circuit to open during an initial phase time period at the beginning of traction slip brake actuation, and valve assemblies (29, 30) inserted in said fluid lines and set to open when the pressure in said fluid lines during the initial phase is just sufficient to apply said wheel brakes to said driven wheels.

6. A brake system as claimed in claim 5, wherein the valve assemblies (29, 30) are designed as spring-biassed non-return valves which are set to the traction slip control pressure in the initial phase.

7. A brake system as claimed in claim 6, wherein one of said non-return valves (29, 30) is assigned to each driven wheel (VR, VL), and wherein said non-return valves are connected to the pressure-compensating reservoir (7) by way of one common, normally closed two-way/two-position directional control valve (28).

* * * * *